United States Patent Office 3,355,470
Patented Nov. 28, 1967

3,355,470
PROCESS FOR PREPARING TRI-CYCLO-HEXYLTIN HALIDES
Joseph G. Natoli, Parlin, N.J., assignor to M & T Chemicals Inc., New York, N.Y., a corporation of Delaware
No Drawing. Filed May 6, 1964, Ser. No. 365,524
8 Claims. (Cl. 260—429.7)

ABSTRACT OF THE DISCLOSURE

In accordance with certain of its aspects, the novel process of this invention for preparing tricyclohexyltin halide $(C_6H_{11})_3SnX$ comprises maintaining a reaction mixture containing dicyclohexyltin dihalide $$(C_6H_{11})_2SnX_2$$

adding to said reaction mixture cyclohexyl magnesium halide $(C_6H_{11})MgX$ in amount of one mole per mole of dicyclohexyltin dihalide, agitating said reaction mixture during said addition whereby said reaction mixture is maintained substantially uniform thereby forming tricyclohexyltin halide $(C_6H_{11})_3SnX$ as product, and recovering said tricyclohexyltin halide.

---

This invention relates to a novel process for preparing organotin compounds. More particularly, it relates to a process characterized by improved yields of selected products.

Prior attempts to produce $R_3SnX$ compounds, typified by tributyltin chloride, have included those wherein an appropriate Grignard reagent has been reacted with tin tetrahalide according to the following reaction:

$$3RMgX + SnX_4 \rightarrow R_3SnX + 3MgX_2 \qquad (1)$$

In the course of this reaction as commonly carried out, the yield of product $R_3SnX$ may be less than stoichiometric because inter alia of the production of by-products including $RSnX_3$, $R_2SnX_2$, and $R_4Sn$. Commonly the amount of $R_3SnX$ obtained may be very low, typically as low as 5–10%. The amount of $R_2SnX_2$ obtained as product, depending on the particular conditions of reaction, may be typically at least 20–30% and commonly 50%. Since commercial requirements may indicate that the desired product is $R_3SnX$, the by-product $R_2SnX_2$ is commonly recovered and converted by varying techniques to attain high yields of $R_3SnX$.

It has been found however that if has not heretofore been possible commercially to convert $R_2SnX_2$ directly to $R_3SnX$; and accordingly it may commonly be first converted to $R_4Sn$ by the reaction:

$$R_2SnX_2 + 2RMgX \rightarrow R_4Sn + 2MgX_2 \qquad (2)$$

The tetra-alkylated tin $R_4Sn$ so-prepared, typically in high yields, may then be converted to $R_3SnX$ by known techniques.

It is an obect of this invention to provide a process for production of organotin compounds in high yields. More specifically, it is an obect of this invention to provide a process for converting dicyclohexyltin dihalide to tricyclohexyltin halide in high yields. Other obects will be apparent to those skilled-in-the-art from inspection of the following description.

In accordance with certain of its aspects, the novel process of this invention for preparing tricyclohexyltin halide $(C_6H_{11})_3SnX$ comprises maintaining a reaction mixture containing dicyclohexyltin dihalide $$(C_6H_{11})_2SnX_2$$

adding to said reaction mixture cyclohexyl magnesium halide $(C_6H_{11})MgX$ in amount of one mole per mole of dicyclohexyltin dihalide, agitating said reaction mixture during said addition whereby said reaction mixture is maintained substantially uniform thereby forming tricyclohexyltin halide $(C_6H_{11})_3SnX$ as product, and recovering said tricyclohexyltin halide.

The cyclohexyltin product $(C_6H_{11})_3SnX$ which may be formed in high yield by practice of this invention, may include products wherein the cyclohexyl group, herein designated $C_6H_{11}$—, may be inertly substituted.

Typical products which may be formed by the process of this invention, in addition to tricyclohexyltin bromide and tricyclohexyltin chloride, may include:

tri(2-methylcyclohexyl)tin chloride
tri(2-butylcyclohexyl)tin chloride
tri(2-phenylcyclohexyl)tin chloride
tri(3,3,5-trimethylcyclohexyl)tin chloride
tri(3,5-dimethylcyclohexyl)tin chloride
tri(4-t-butylcyclohexyl)tin chloride
tri(2-isopropyl,5-methylcyclohexyl)tin chloride
tri(2,5-dimethylcyclohexyl)tin chloride
tri(3,4-dimethylcyclohexyl)tin chloride together with the corresponding bromide derivatives, etc.

The dicyclohexyltin dihalide which may be used in practice of this invention $(C_6H_{11})_2SnX_2$ may include compounds wherein the cyclohexyl group is inertly substituted (q.v. the products supra) and wherein X may preferably be an active halide selected from the group consisting of chloride and bromide. Preferably the dicyclohexyltin dihalide may be dicyclohexyltin dichloride.

The Grignard reagent which may be used in practice of this invention, preferably cyclohexylmagnesium chloride, (and including Grignard reagents containing inertly substituted cyclohexyl radicals as noted supra) may be prepared by the reaction of a cyclohexyl halide with magnesium according to the following reaction:

$$(C_6H_{11})X + Mg \rightarrow (C_6H_{11})MgX \qquad (3)$$

This reaction may preferably be carried out under an inert atmosphere, e.g. nitrogen gas, in the presence of an aliphatic ether such as diethyl ether, di-n-butyl ether, etc. or in the presence of a compound Q as hereinafter described. Various initiators may be present to facilitate formation of the Grignard reagent.

The compound Q, as this expression is used herein for brevity, includes cyclic ethers containing 5–6 members in the ring with at least one hydrogen atom attached to each carbon atom in the ring and having the formula:

wherein X is a methylene group or an N-alkyl group; R" is an unsubstituted saturated divalent aliphatic hydrocarbon radical; R' is an ethylene radical, an ethylenically unsaturated divalent hydrocarbon radical, a methylene radical, or =CHR''', (R''' being hydrogen or an aliphatic radical); and O is oxygen. When X is N-alkyl, the ring shall contain 6 members with X and O in a position 1:4 with respect to each other.

Compounds within this definition include tetrahydrofuran, tetrahydropyran, 2-methyltetrahydrofuran, 2-ethoxytetrahydropyran, tetrahydrofurfurylethyl ether, dihydropyran, and N-methylmorpholine. The compound Q may bear inert groups i.e. groups which are not reactive with organomagnesium halides, or with any of the components and products of the reaction mixtures of the present process. Illustrative inert substituents may include substituted and unsubstituted alkyl, aryl, alkoxy, and aryloxy groups (including those bearing substituents thereon which are unreactive to other components of the reaction mixture as herein specified). Where nitrogen replaces a carbon atom in the ring at X, the nitrogen atom must be substituted with a group, such as an alkyl group, which is unreactive to the reactants or reaction products.

It is a characteristic of compound Q that the oxygen is available for electron donation, i.e. the free π-electrons present on the oxygen are available for coordination with the Grignard reagent. Any large blocking groups on the carbon atoms adjacent to the ring oxygen may impair the availability of these electrons and the reactivity of the compound for forming a complex and assisting in the reaction. In addition to the compounds listed above as being suitable for compound Q, other equivalent compounds satisfying the requirements for this complexing agent and solvent will be apparent to those skilled in the art from the present specification. Since compound Q may also function as a solvent, a compound Q which has a high melting point may be used in practice of this invention, but if it is used as solvent, the high melting point (e.g. above 90° C.) may cause difficulty in carrying out the reaction.

The Grignard reagent formed by the process of e.g. Reaction 3 supra may be preferably in the form of a solution of its complex with the ether or the compound Q, e.g. as a solution of $(C_6H_{11})MgX.nQ$ in Q. For purpose of convenience, the equations herein are written without reference to the ether or compound Q which may be present.

The Grignard reagent and/or the reaction mixture may preferably also contain an inert hydrocarbon, typically xylene, toluene, etc. preferably xylene.

In practice of this invention, the reaction between the dicyclohexyltin dihalide and the cyclohexylmagnesium halide may be as follows:

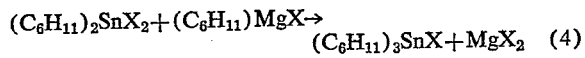
$$(C_6H_{11})_2SnX_2 + (C_6H_{11})MgX \rightarrow$$
$$(C_6H_{11})_3SnX + MgX_2 \quad (4)$$

This reaction may be carried out by adding to a reaction vessel 1–100 mole percent, preferably 10–40 mole percent, say 25 mole percent of the $(C_6H_{11})_2SnX_2$ to be used in the reaction. Preferably this may also be added with appropriate solvent, typically a hydrocarbon having a boiling point of 30°–150° C., say about 137° C., including e.g. toluene, heptane, cyclohexane, etc. The preferred hydrocarbon may be xylene which may be added to the $(C_6H_{11})_2SnX_2$ in amount of 10–20 moles, say 15 moles, per mole of $(C_6H_{11})_2SnX_2$ to be consumed during the reaction. In the preferred embodiment of the invention, the dicyclohexyltin dihalide and the solvent may be added to the reaction vessel in the form of a solution of dicyclohexyltin dihalide in the solvent.

To the preferably well-agitated reaction mixture containing $(C_6H_{11})_2SnX_2$ in excess of $(C_6H_{11})MgX$, and preferably containing none of the latter, there may be simultaneously added the remainder of the $(C_6H_{11})_2SnX_2$, i.e. 0–99 mole percent, preferably 60–90 mole percent, say 75 mole percent of the $(C_6H_{11})_2SnX_2$ used in the reaction, together with all of the Grignard reagent $(C_6H_{11})MgX$.

In the preferred embodiment, the rates of addition of the added $(C_6H_{11})MgX$ and the $(C_6H_{11})_2SnX_2$ during addition may be preferably maintained at 1 mole of $(C_6H_{11})MgX$ per mole of $(C_6H_{11})_2SnX_2$. Control of the ratio during addition at the stated equivalent level of preferably 1:1 may be effected by controlling the flow of each of the reactants. The unusual results attained by the process of this invention may particularly result at least in part from the technique of controlling the ratio of rates of addition of the added materials so that it is an equivalent amount i.e. so that it falls within this ratio of about 1±0.1:1. Thus the reaction medium at a given time may be considered as having been formed by mixing the reactants in equivalent i.e. 1:1 molar proportion, preferably in the presence of an excess of $(C_6H_{11})_2SnX_2$, corresponding to that which was present, if any, in the reaction vessel at the beginning of the reaction. The high degree of agitation preferably maintained in the reaction mixture insures that the reaction mixture is maintained uniform i.e. that at no place in the reaction mixture is there any localized substantial excess of $(C_6H_{11})MgX$. It will be noted that the final reaction mixture preferably contains substantially equimolar amounts of tin and magnesium.

Preferably the exothermic reaction mixture may be maintained at 25°–95° C., preferably less than 80° C., say at 72° C. Reaction may, if desired, be carried out at 30°–40° C. Typically the $(C_6H_{11})MgX$ and $(C_6H_{11})_2SnX_2$ may be added to the reaction mixture over 60–210 minutes, say 120 minutes.

The remainder of the Grignard reagent $(C_6H_{11})MgX$, typically 25 mole percent, may then be added to the reaction mixture over 15–60 minutes, say 30 minutes. Preferably the reaction mixture may, during this addition, be maintained at gentle reflux temperature, typically 75°–85° C. when the refluxing liquid includes e.g. xylene-tetrahydrofuran, for 30–240 minutes, say 120 minutes.

The reaction mixture may then by hydrolyzed to liberate the product $(C_6H_{11})_3SnX$. Typically this may be effected by diluting the mixture at 30°–40° C., say 30° C. with water, preferably containing electrolyte such as sulfuric acid in the amount of 1–15%, say 10% by weight. Typically the reaction mass, at 30°–40° C., may be completely hydrolyzed by mixing with 400–740, say 500 parts by weight of water, preferably followed by the addition of electrolyte, such as 10% sulfuric acid, in an amount of 300–600, say 500 parts. The organic layer which separates may be decanted.

In accordance with certain aspects of this invention, the organic layer may be stripped of solvent by distillation. Preferably distillation may be effected at atmospheric pressure for 120–240 minutes, say 180 minutes to pot temperature of 135°–155° C., typically 145° C. The reaction mixture may be further distilled at pressure of 10–55 mm. Hg typically 25–35 mm. Hg to a final pot temperature of about 130°–155° C., say 145° C.

The residue at temperature of at least about 130° C., and preferably 130°–140° C., may be mixed with solvent, preferably isopropanol, in amount of 400–2000, say 1200 parts. Preferably the mixture may be heated to reflux for 10–60 minutes, say 30 minutes and filtered to remove tetracyclohexyltin by-product. The solvent may be cooled to 0° C.–25° C., say 15° C., to precipitate product which may be filtered and washed with 50–250, say 100 parts of cooled solvent. The product may then be oven-dried by 35°–100° C., say 50° C., for 60–600 minutes, say 240 minutes, until it is free of solvent. Typical yield of product may be 70–90%. When tricyclohexyltin chloride is prepared in accordance with the preferred embodiment of this invention, this product may be recovered in yield of typically 70–90% having a melting point of 128°–129° C.

The solvent-filtrate may be distilled to recover solvent as distillate and a residue of by-products which may be further worked-up to yield additional product.

Practice of this invention may be observed by reference to the following illustrative examples wherein all parts noted are parts by weight unless otherwise specified.

*Example 1*

In this example which represents practice of the invention, cyclohexylmagnesium chloride Grignard reagent may be prepared by charging 125.7 parts of magnesium turnings to a reaction vessel which may be purged with nitrogen gas. 155 parts of tetrahydrofuran may be added together with an initiation mixture containing 9.1 parts of cyclohexyl bromide and 8 parts of cyclohexyl chloride. The mixture is heated to initiate the Grignard formation and the temperature may rise to 70°–75° C. To the reaction mixture, there may be added slowly a mixture containing 599 parts of cyclohexyl chloride and 1134 parts of tetrahydrofuran with agitation. During addition over 60–120 minutes, external heating may be applied and maintained until the temperature is raised to about 75° C. Thereafter reaction may proceed exothermically with pot temperature reaching as high as 78° C. reflux temperature over the course of 60 minutes. The reaction mixture may then be cooled to room temperature. It contains Grignard reagent in 2.24 molar solution.

 (5)

A charge solution containing 178 parts, 0.5 mole of dicyclohexyltin dichloride and 175 parts of xylene may be prepared, be charged into a reaction vessel together with 645 parts of xylene, and heated to 70° C.

The 222 parts (0.5 mole) of cyclohexylmagnesium chloride Grignard reagent may then be added to the reaction vessel over approximately one hour at 70°–75° C. The temperature may rise to 80° C. during addition.

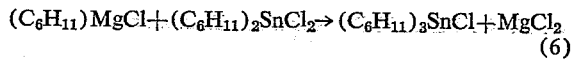 (6)

At the end of this time, the reaction mixture may then be maintained at 85°–90° C., gentle reflux, for 1 hour.

The reaction mixture may be cooled to 40° C. and mixed with 75 parts of water and 25 parts of 5% sulfuric acid. The organic layer which may be formed may be separated. The organic layer may be stripped of solvent by atmospheric pressure distillation over 180 minutes to pot temperature of 140° C. followed by vacuum distillation at 35 mm. Hg.

The residue from this distillation may be poured into 640 parts of isopropanol solvent. The mixture may be heated to reflux over 30 minutes, filtered hot, and cooled to 15° C. at which point product tricyclohexyltin chloride may precipitate. The white crystalline precipitate may be filtered, washed with 25 parts of cold isopropanol, and oven-dried at 50° C. for 3–5 hours. 163 parts (81% yield) of tricyclohexyltin chloride may be obtained having a melting point of 129°–130° C. Sn: 29.5%, calc. 29.4%; Cl: 9.0%, calc. 8.8%.

Examples 2 and 3 are a comparative series of examples wherein Example 2 is a control example identical to Example 1 except that the desired product is tributyltin chloride; and Example 3 is an identical control process except that the desired product is triphenyltin chloride.

*Example 2*

In this control example, a charge solution containing 152 parts (0.5 mole) of dibutyltin dichloride and 130 parts of xylene may be charged into a reaction vessel. An addition funnel may be charged with 220 parts (0.5 mole) of a solution of butylmagnesium chloride in 161.1 parts of tetrahydrofuran (prepared in the same manner as the Grignard composition used for Example 1 except that it was prepared from butyl chloride rather than from cyclohexyl chloride).

The butyl Grignard may be fed into the reaction vessel over 60 minutes. During the addition, the temperature is maintained by cooling if necessary at 50°–70° C. At the completion of this addition, the reaction mass may be maintained at 60°–70° C. for 80 minutes.

The reaction mass cooled to about 25°–35° C. may be hydrolyzed by the addition of 200 parts of water and 15 parts of hydrochloric acid. The organic layer may be separated and the solids contained therein filtered off. The organic layer may be stripped to a pot temperature of 75° C./15–25 mm. Hg and the residue on work-up on analysis by vapor phase chromatography may be found to contain the following expressed in terms of weight percent yield:

|  | Percent |
| --- | --- |
| Tetrabutyltin | 45.8 |
| Tributyltin chloride | 4.1 |
| Dibutyltin dichloride | 51.0 |

*Example 3*

In this control example, a charge solution containing 171.9 parts (0.5 mole) of diphenyltin dichloride and 130 parts of xylene may be charged into a reaction vessel. An addition funnel may be charged with 202 parts (0.5 mole) of a solution of phenylmagnesium chloride in 133.6 parts of tetrahydrofuran (prepared in the same manner as the Grignard composition used for Example 1 except that it was prepared from chlorobenzene rather than from cyclohexyl chloride).

The phenyl Grignard may be fed into the reaction vessel over 65 minutes. During the addition, the temperature may rise to 60°–70° C. At the completion of this addition, the reaction mass may be maintained at 75° C. for one hour.

The reaction mass cooled to about 30°–40° C. may then by hydrolyzed by the addition of 250 parts of water and 15 parts of hydrochloric acid. The organic layer may be separated and the solids contained therein filtered off. The white crystalline solids may be dried at 50° C. for 12 hours to give 102 parts of white crystalline crude tetraphenyltin, M.P. 227°–234° C. This corresponds to a 48% yield of tetraphenyltin based on diphenyltin dichloride.

The organic filtrate may be stripped to pot temperature of 145° C./20–30 mm. Hg. The residue may be treated with 100 parts of hot isopropanol and cooled to 15° C. A negligible amount of triphenyltin chloride crystallized out and may be filtered off. The isopropanol may be distilled off and the residue cooled. The residue, 96 parts (M.P. 36°–42° C.) may be diphenyltin dichloride. The yield of this reaction, expressed in terms of weight percent yield (the tetraphenyltin being obtained by filtration supra) may be:

|  | Percent |
| --- | --- |
| Tetraphenyltin | 48 |
| Triphenyltin chloride | 0 |
| Diphenyltin dichloride | 55 |
| Monophenyltin trichloride | 0 |

From inspection of comparative Examples 1, 2, and 3, it will be apparent that the novel process of this invention for the production of tricyclohexyltin halides may typically permit attainment of an 81% yield; in contrast, as noted in Example 2, only 4.1% tributyltin chloride may be attained and Example 3 wherein 0% of triphenyltin chloride may be attained.

Although this invention has been disclosed by reference to various specific examples, it will be apparent to those skilled in the art that various modifications and changes may be made thereto which fall within the scope of this invention. In the specification and claims, the radical $C_6H_{11}$ (as hereinbefore set forth) is the cyclohexyl radical.

What is claimed is:

1. The process for preparing $(C_6H_{11})_3SnX$ wherein X is selected from the group consisting of chloride and bromide which comprises maintaining a reaction mixture containing $(C_6H_{11})_2SnX_2$, adding to said reaction mixture $(C_6H_{11})MgX$ in amount equivalent to $(C_6H_{11})_2SnX_2$, agitating said reaction mixture during said addition whereby said reaction mixture is maintained substantially uniform thereby forming $(C_6H_{11})_3SnX$, and recovering said $(C_6H_{11})_3SnX$.

2. The process of claim 1 wherein said reaction mixture is maintained at temperature of 25°–95° C. during said addition.

3. The process of claim 1 wherein said reaction is out in the presence of aliphatic ether.

4. The process of claim 1 wherein said reaction mixture comprises $(C_6H_{11})_2SnX_2$ and a hydrocarbon solvent having a boiling point of 30°–150° C.

5. The process of claim 1 wherein said $(C_6H_{11})MgX$ is added as a solution of its ether complex in aliphatic ether.

6. The process of claim 1 wherein said $(C_6H_{11})MgX$ is added to said reaction mixture in amount of 1±0.1 mole per mole of $(C_6H_{11})_2SnX_2$.

7. The process for preparing $(C_6H_{11})_3SnX$ wherein X is selected from the group consisting of chloride and promide by the reaction of $(C_6H_{11})MgX$ and $$(C_6H_{11})_2SnX_2$$

in molar ratio of 1:1 which comprises maintaining a reaction mixture containing $(C_6H_{11})_2SnX_2$ in excess of $(C_6H_{11})MgX$, simultaneously adding to said reaction mixture $(C_6H_{11})MgX$ and the remainder of said $$(C_6H_{11})_2SnX_2$$

agitating said reaction mixture during said addition whereby said reaction mixture is maintained substantially uniform and adding to said reaction mixture the remainder of said $(C_6H_{11})MgX$ thereby forming $(C_6H_{11})_3SnX$, and recovering said $(C_6H_{11})_3SnX$.

8. The process for preparing $(C_6H_{11})_3SnX$ wherein X is selected from the group consisting of chloride and bromide which comprises maintaining a reaction mixture containing $(C_6H_{11})_2SnX_2$, adding to said reaction mixture $(C_6H_{11})MgX$ and $(C_6H_{11})_2SnX_2$ in equivalent amounts, thereafter adding additional $(C_6H_{11})MgX$ thereby forming a reaction mixture containing substantially equimolar amounts of tin and magnesium, agitating said reaction mixture during said addition, whereby said reaction mixture is maintained substantially uniform thereby forming $(C_6H_{11})_3SnX$, and recovering said $$(C_6H_{11})_3SnX$$

References Cited
UNITED STATES PATENTS

| | | | |
|---|---|---|---|
| 2,675,397 | 4/1954 | Ramsden | 260—429.7 |
| 3,010,979 | 11/1961 | Ramsden | 260—429.7 |

TOBIAS E. LEVOW, *Primary Examiner.*

W. F. W. BELLAMY, *Assistant Examiner.*